(12) United States Patent
Hardjono et al.

(10) Patent No.: US 7,539,313 B1
(45) Date of Patent: May 26, 2009

(54) SYSTEM AND METHOD FOR KEY MANAGEMENT ACROSS GEOGRAPHIC DOMAINS

(75) Inventors: Thomas P. Hardjono, Winchester, MA (US); Lakshminath Dondeti, Chelmsford, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 198 days.

(21) Appl. No.: 09/952,328

(22) Filed: Sep. 13, 2001

Related U.S. Application Data

(60) Provisional application No. 60/232,325, filed on Sep. 13, 2000.

(51) Int. Cl.
*H04L 9/00* (2006.01)

(52) U.S. Cl. .................. 380/278; 713/162; 713/163

(58) Field of Classification Search .......... 380/278; 713/162, 163
See application file for complete search history.

(56) References Cited

U.S. PATENT DOCUMENTS

| | | | |
|---|---|---|---|
| 4,549,308 A * | 10/1985 | LoPinto | 380/272 |
| 4,802,220 A * | 1/1989 | Marker, Jr. | 380/33 |
| 4,972,479 A * | 11/1990 | Tobias et al. | 380/33 |
| 5,060,266 A * | 10/1991 | Dent | 380/274 |
| 5,237,612 A * | 8/1993 | Raith | 380/247 |
| 5,241,598 A * | 8/1993 | Raith | 380/248 |
| 5,408,419 A * | 4/1995 | Wong | 709/225 |
| 5,982,897 A * | 11/1999 | Clark | 380/258 |
| RE37,141 E * | 4/2001 | O'Sullivan | 455/557 |
| 6,370,629 B1 * | 4/2002 | Hastings et al. | 711/163 |
| 6,377,810 B1 * | 4/2002 | Geiger et al. | 455/456.2 |
| 6,393,300 B1 * | 5/2002 | Douthea et al. | 455/555 |
| 6,424,713 B1 * | 7/2002 | Sprunk | 380/44 |
| 6,684,331 B1 * | 1/2004 | Srivastava | 713/163 |
| 6,690,798 B1 * | 2/2004 | Dent | 380/248 |
| 6,768,942 B1 * | 7/2004 | Chojnacki | 701/200 |
| 6,839,434 B1 * | 1/2005 | Mizikovsky | 380/247 |
| 6,934,839 B1 * | 8/2005 | Pagel | 713/156 |
| 7,013,391 B2 * | 3/2006 | Herle et al. | 713/182 |
| 7,113,600 B1 * | 9/2006 | Rosenhed | 380/272 |
| 7,120,254 B2 * | 10/2006 | Glick et al. | 380/258 |
| 7,143,289 B2 * | 11/2006 | Denning et al. | 713/168 |
| RE39,427 E * | 12/2006 | O'Sullivan | 455/557 |

(Continued)

OTHER PUBLICATIONS

Suvo Mittra, "Iolus: A Framework for Scalable Secure Multicasting", Proceeding of the ACM SIGCOMM '97, Sep. 14-18, 1997 http://www.ece.cmu.edu/~adrian/731-sp04/readings/iolus.pdf.*

(Continued)

*Primary Examiner*—David Garcia Cervetti
(74) *Attorney, Agent, or Firm*—Anderson Gorecki & Manaras LLP

(57) ABSTRACT

A method for managing encryption keys in a communication system having a plurality of communication devices includes establishing a set of cryptographic keys for secure communication. Each of the cryptographic keys is associated with a geographic region. A geographic region is determined for a communication device and at least one cryptographic key is distributed to the communication device based on the geographic region of the communication device. At least one cryptographic key may be used to derive further cryptographic keys associated with a set of sub-regions of the geographic region associated with the communication device.

6 Claims, 3 Drawing Sheets

U.S. PATENT DOCUMENTS

| | | | | |
|---|---|---|---|---|
| 7,266,687 | B2* | 9/2007 | Sowa et al. | 713/163 |
| 2002/0051540 | A1* | 5/2002 | Glick et al. | 380/258 |
| 2002/0136407 | A1* | 9/2002 | Denning et al. | 380/258 |
| 2002/0146125 | A1* | 10/2002 | Eskicioglu et al. | 380/255 |
| 2002/0154781 | A1* | 10/2002 | Sowa et al. | 380/278 |
| 2003/0035544 | A1* | 2/2003 | Herle et al. | 380/270 |
| 2004/0222699 | A1* | 11/2004 | Bottomley | 307/9.1 |
| 2007/0086593 | A1* | 4/2007 | Denning et al. | 380/286 |
| 2008/0013737 | A1* | 1/2008 | Sowa et al. | 380/278 |

OTHER PUBLICATIONS

D. Wallner et al, "Key Management for Multicast: Issues and Architecture", Request for comments: 2627, Jun. 1999 ftp://ftp.isi.edu/in-notes/rfc2627.txt.*

A. Selcuk et al, "Probabilistic Optimization of LKH-based Multicast Key Distribution Schemes", Internet-Draft, Jan. 2000 http://www.potaroo.net/ietf/idref/draft-selcuk-probabilistic-lkh/.*

M. Waldvogel et al, "The VersaKey Framework: Versatile Group Key Management", IEEE Journal on Selected Areas in Communications, vol. 17, No. 9, Sep. 1999 http://ieeexplore.ieee.org/iel5/49/17168/00790485.pdf?arnumber=790485.*

Balenson, D., et al., "Key Management for Large Dydnamic Groups:One-Way Function Trees and Amoritized Initialization", <draft-irtf-smug-groupjeymgmt-oft-00.txt>, Aug. 25, 2000.

Briscoe, Bob, "MARKS: Zero Side Effect Multicast Key Management using Arbitrarily Revealed Key Sequences", in *First International Workshop on Networked Group Communication* (Nov. 1999).

Hardjono, T., et al, "A Framework for Group Key Management for Multicast Security", <draft-ief-ipsec-gkm framework-03.txt), Aug. 2000.

Hardjono, T., et al., "Intra-Domain Group Key Management Protocol", <draft-irtf-smug-intragkm-00.txt>, Sep. 2000.

Wallner, D., et al, "Key Management for Multicast: Issues and Architectures", RFC2627, Jun. 1999.

Wong, Chung Kei, et al., "Secure Group Communications Using Key Graphs", WGL98, in *Proceedings of SIGCOMM'98*, Sep. 1998.

* cited by examiner

SYSTEM AND METHOD FOR KEY MANAGEMENT ACROSS GEOGRAPHIC DOMAINS

PRIORITY

The present application claims priority from U.S. provisional application No. 60/232,325, filed Sep. 13, 2000, which is herein incorporated by reference.

FIELD OF THE INVENTION

The invention generally relates to communication systems and, more particularly, the invention relates to encryption key management in a communication system.

BACKGROUND OF THE INVENTION

Systems for secure communications rely on cryptographic techniques to ensure that communications within the system are available to authenticated users or communication devices only. Generally, a message is encrypted with a cryptographic key so that only authenticated users or communication devices can decrypt the message. Even in the simplest case of a single user, the protocol for providing the proper key to the proper user can be rather elaborate. In a network having multiple authorized users with various sending and receiving privileges, the distribution and management of cryptographic keys can be quite complicated.

Some key management protocols for group-shared keys employ the so-called Wallner tree, more generally known as a "key tree". Key trees are of major importance for key management of group-communications, such as IP multicast and application-layer group transmissions. In a key-tree, a hierarchy of cryptographic keys is created based on a special selected mathematical function. The key for a given node in the tree is derived from the key of its parent node, and the keys for its children nodes are derived from itself. An example of a mathematical function used to form a key tree is the one-way hash function (OWHF), where a ChildKey=OWHF(ParentKey). Specific systems using a key tree approach are described, for example, in D. M. Wallner, E. Harder, R. C. Agee, *Key Management for Multicast: Issues and Architectures*, September 1998; and C. K. Wong, M. Gouda and S. Lam, "Secure Group Communications Using Key Graphs", in Proceedings of SIGCOMM '98, which are herein incorporated by reference.

An example of a key tree is shown in FIG. 1, where the solid points represent nine authorized entities (a root and eight users U1, U2 ..., U8). In this structure, each of the eight users has an associated private key (K1, K2, ..., K8) that is known only to the owning user and the root. In this specific structure, the private key typically is used for private communications between the root and the respective user (unicast).

A key tree is a logical tree, meaning that the keys of the internal nodes are shared by the root and by some of the users. For example, a user may know all the keys in the tree starting from its position at a leaf node, back up the internal nodes directly to the root. Thus, in FIG. 1 for example, user U2 knows its own private key K2, and keys X3 and X1. User U4 knows K4 (its own key), X4 and X1, while User U6 knows keys K6, X5 and X2.

One typical use of a key tree is for management of a Traffic Encryption Key (TEK) that is used for the encryption of data being multicasted to a group, and a Key Encryption Key (KEK) for encrypting the TEK when the TEK is transmitted. The root is typically assigned to hold the TEK and the KEK, and it uses the keys within the key tree to send the encrypted TEK either to all the users on the tree, or only to specific selected users. Thus, assuming the TEK is to be multicasted to the entire group, the Root would simply encrypt the TEK under the KEK and send the encrypted TEK to the multicast address of the group. Non-members may be able to snoop the packet, but they will not be able to decrypt that packet containing the encrypted TEK. To send the TEK or KEK to a subset of the entire group (for example, users U1, U2, U3 and U4 in FIG. 1), the root can use key X1 to encrypt the designated TEK or KEK, and multicast the ciphertext to the entire group in a single message. The other users (U5, U6, U7 and U8 in FIG. 1) will simply drop that packet since they will not be able to decrypt it.

At first, it might appear simpler to associate a single key with each user and manage each of these individual keys as required. But, for each user in a large group to be able to communicate with each of the other users, all users must have the keys for all of the other users. This is a significant management problem that involves the distribution of large numbers of keys and substantial storage requirements; a problem made even more difficult when accounting for factors such as adding and deleting members of the group. The logical hierarchy of the key tree and the encryption keys associated with the higher level nodes means that key management can use fewer and smaller messages containing fewer keys broadcast over the network using less bandwidth than would be possible with a simpler scheme.

From the above example, it is easy to see that key trees are useful for the management of cryptographic keys within groups. Currently, efforts are underway in the IETF to standardize group key protocols.

In another application, a key tree may be used for pay-per-view type subscription services as described, for example, in B. Briscoe, *Zero Side Effect Multicast Key Management using Arbitrarily Revealed Key Sequences*, BT Labs Report 1999, which is incorporated herein by reference.

Thus, key trees are known to be useful for distributing cryptographic communications keys to multiple users in a computer network.

SUMMARY OF THE INVENTION

In an embodiment of the invention, a method for managing encryption keys in a communication system having a plurality of communication devices includes establishing a set of encryption keys for secure communication, each cryptographic key associated with a geographic region. The method further includes determining a geographic region associated with a communication device and distributing at least one cryptographic key to the communication device based on the geographic region of the communication device. In a further embodiment, the communication system is a wireless communication system and the communication devices may be mobile devices. In a further embodiment, at least one cryptographic key is used to derive further cryptographic keys associated with a set of sub-regions of the geographic region associated with the communication device.

In accordance with another embodiment of the invention, a communication system is provided having a plurality of communication devices and a plurality of geographic regions and sub-regions. The communication system also includes a hierarchical tree of cryptographic keys, each cryptographic key associated with a geographic region or sub-region. In one embodiment, at least one cryptographic key in the hierarchical tree is derived by applying a mathematical function to the cryptographic key of the next higher level in the hierarchical tree. In a further embodiment the set of communication devices may be a set of wireless communication devices.

In accordance with yet another embodiment, a computer program product for managing encryption keys in a communication system having a plurality of communication devices comprises a computer useable medium having computer readable code thereon. The computer readable medium comprises program code for establishing a set of cryptographic keys for secure communication where each cryptographic key is associated with a geographic region, program code for determining a geographic region associated with a communication device and program code for distributing at least one cryptographic key to the communication device based on the geographic region of the communication device.

In one embodiment, the at least one cryptographic key is used to derive further cryptographic keys associated with a set of sub-regions of the geographic region associated with the communication device. In another embodiment, the communication system may be a wireless communication system and the communication device may be a wireless device.

BRIEF DESCRIPTION OF THE DRAWINGS

The foregoing description of various embodiments of the invention should be appreciated more fully from the following further description thereof with reference to the accompanying drawings wherein.

DESCRIPTION OF PREFERRED EMBODIMENTS

In an embodiment of the present invention, a hierarchical tree of cryptographic keys are managed by associating each key (or node) of the tree with a geographic region or sub-region of a communication system. Communications within each geographic region or sub-region are encrypted under the key associated with that region or sub-region. The communication system may be wired-based or wireless. A user or communication device is given a set of keys from the key hierarchy depending on the geographic region in which the user is located. The key hierarchy may be derivative, i.e., the keys are related and derived from one another using, for example, mathematical functions. In the alternative, the key hierarchy may not be derivative, i.e., the keys are unrelated and each user will have received all necessary keys from the key tree for secure communications.

Figure 1:
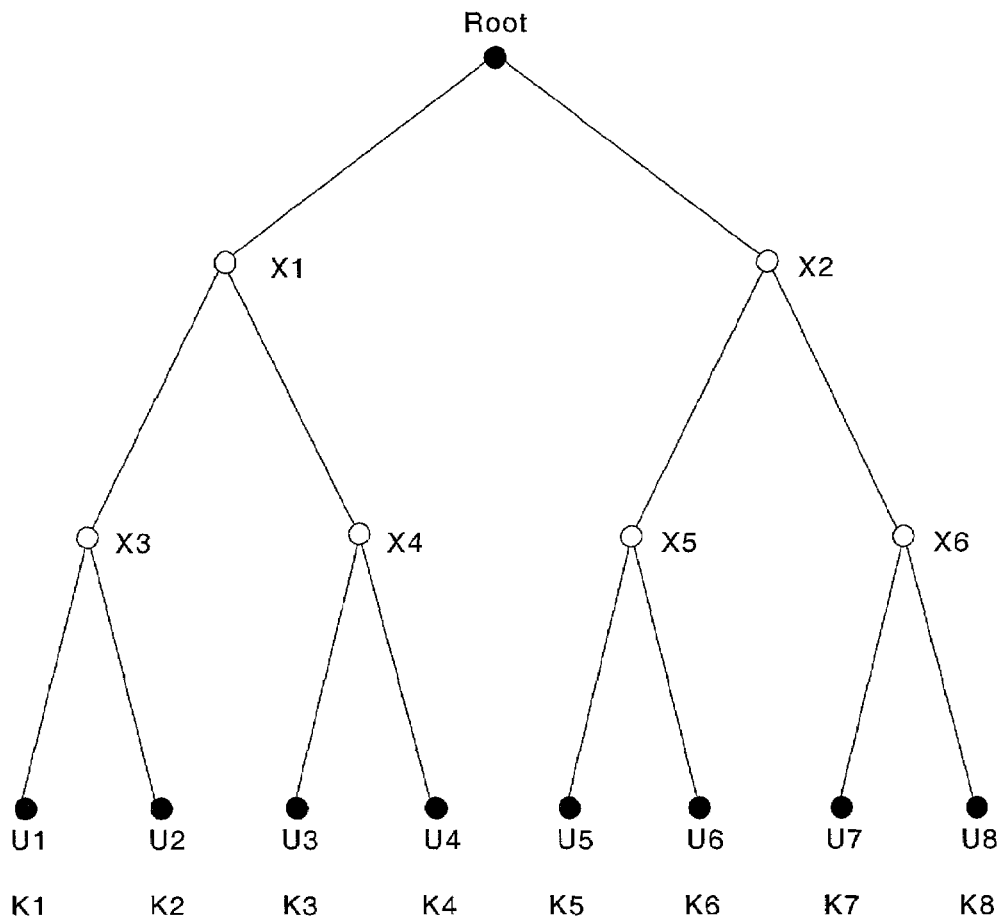
FIG. 1 shows a typical key tree.
Figure 2:
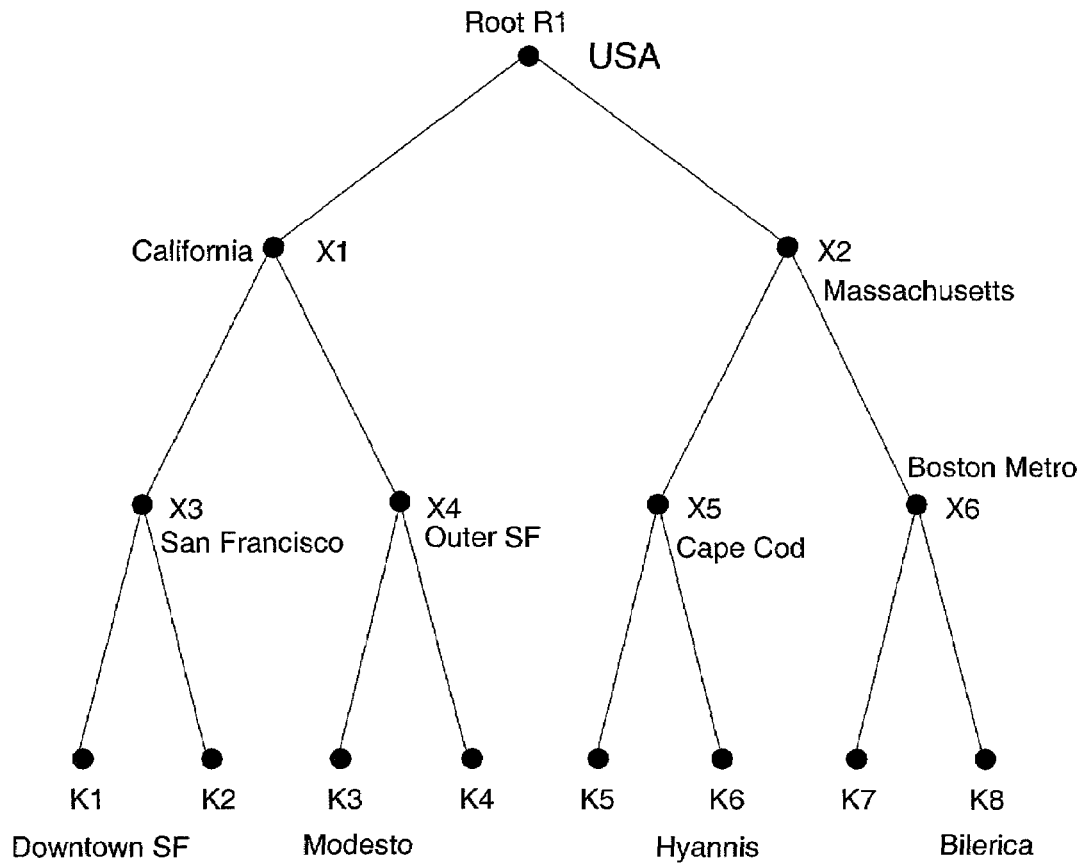
FIG. 2 shows a key tree with a hierarchy based on geographic regions in a communication system in accordance with an embodiment of the invention.

FIG. 2 shows a key tree with a hierarchy based on geographic regions and sub-regions in accordance with an embodiment of the invention. The embodiment of FIG. 2 relates to a secure wireless communication system. While the invention will be described generally with reference to a wireless communication system, it is to be understood that wired-based communication systems may similarly benefit from various embodiments and improvements that are subjects of the present invention. In a wireless communication system, the communication devices of users may be, for example, mobile devices. Other communication devices include, for example, routers, modems, switches, etc.

In FIG. 2, the root node (key) R1 of the key tree is associated with, for example, the broadest geographical area of the communication system such as the United States. Each of the nodes lower on the tree are associated with sub-regions of the root node. In FIG. 2, the node X1 is associated with the geographic sub-region of California and the node X2 is associated with the geographic sub-region of Massachusetts.

If a user, having a wireless device, is located or roaming in a particular sub-region such as Billerica (shown in FIG. 2), key K8 is distributed to the user to decrypt and encrypt the communication transmission in the Billerica area. If the user were also roaming in the sub-region of Hyannis, the user would be given key K6 in order to decrypt and encrypt the communication transmission in the Hyannis region.

If a user is authorized (e.g., the user has subscribed to services in a particular region or sub-region) to access the communication system in the Boston Metro region, the user will be given key X6, as shown in FIG. 2. If the key hierarchy is derivative, that user would also be able to derive key's K8 and K7 from key X6 by applying a mathematical function to key X6. When a user is located (or roaming) in their subscription area, the user's mobile device will tune into the correct frequency of transmission (e.g., multicast or broadcast) in order to obtain the correct communication transmission. Once the mobile device has obtained the correct transmission, the mobile device will apply the key to decrypt the transmission.

As shown in FIG. 2, if a user subscribes to the California region and the user is located in Downtown San Francisco, the user's mobile device will derive the key K1 (for the Downtown Sa Francisco region) from the keys X1 (California) and X3 (San Francisco). Once the user's mobile device has the key K1, the device may tune into the Downtown San Francisco transmission and automatically apply key K1 (Downtown San Francisco) to decrypt the transmission.

In an alternative embodiment, the key hierarchy may not be derivative as discussed above. If the key hierarchy is not derivative, each key is unrelated to the others. The mobile device of a user must be provided with each key related to the regions and sub-regions to which the user subscribes. Accordingly, the mobile device will simply apply the appropriate key based on the geographic location of the user. For example, in a wireless media service that broadcast according to the levels with the key hierarchy shown in FIG. 2, the Massachusetts region is associated with Key X2. In the Massachusetts region, there will be broadcasts for the sub-regions, Billerica (K8), Boston Metro (X6) as well as the entire Massachusetts region. The larger-region broadcast (i.e., Massachusetts) is also received in the sub-regions of the hierarchy. Thus, there is an overlap of broadcasting and the keys possessed by the user's mobile device determine which broadcast is decipherable by the user.

Figure 3:
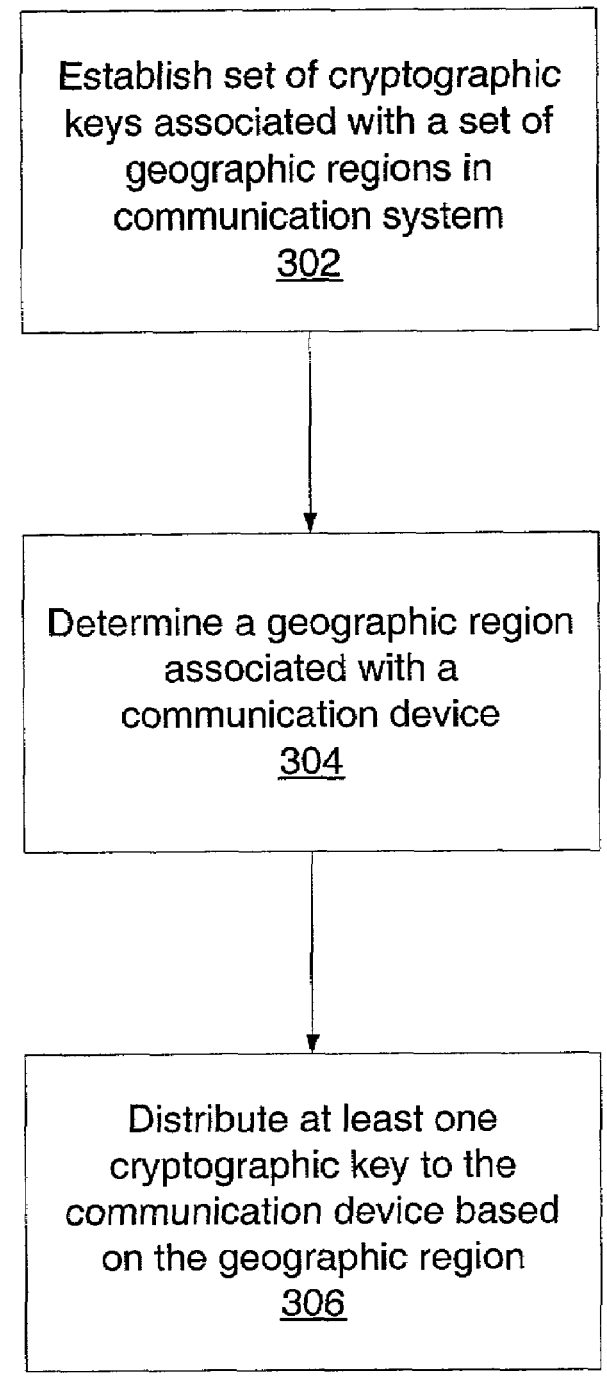
FIG. 3 illustrates the logical flow of control of a method for key management across geographic domains in a communication system in accordance with an embodiment of the invention.

FIG. 3 illustrates the logical flow of control of a method for key management across geographic domains in a communication system in accordance with an embodiment of the invention. At block 302, a set of cryptographic keys is established for the communication system. Each cryptographic key is associated with a geographic region or sub-region of the communication system. Communications within each geographic region or sub-region are encrypted under the key associated with the region or sub-region. As discussed above, a hierarchical key tree may be used to establish the key hierarchy. The key hierarchy may be derivative, i.e., the keys are related and derived from one another using, for example, mathematical functions. In the alternative, the key hierarchy may not be derivative, i.e., the keys are unrelated and each user will have received all necessary keys from the key tree for secure communications.

At block 304, the geographic region associated with a particular communication device (or user) in the communication system is determined in order to select the correct key from the key hierarchy. Once the geographic region of the communication device is determined, at block 306 at least one cryptographic key is distributed to the communication device based on the geographic region. As discussed above, in one embodiment, keys on lower levels of the key hierarchy may be derived from keys on higher levels of the key hierarchy. In an alternative embodiment, a communication device may be provided with the set of keys that relate to the geographic regions of the communication region to which a user subscribes.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit(ASIC)), or other means including any combination thereof.

Computer program logic implementing all or part of the functionality previously described herein may be embodied in various forms, including, but in no way limited to, a source code form, a computer executable form, and various intermediate forms (e.g., forms generated by an asembler, compiler, linker, or locator). Source code may include a series of computer program instructions implemented in any of various programming languages (e.g., an object code, an assembly language, or a high level language such as Fortran, C, C++, JAVA, or HTML) for use with various operating systems or operating environments. The source code may define and use various data structures and communication messages. The source code may be in computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, EEPROM, or Flash-programmable RAM), a magnetic memory device (e.g., a diskette or fixed disk), an optical memory device (e.g., a CD-ROM), or other memory device. The computer program may be distributed in any form as a removable medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or ADL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A method for managing encryption keys in a communication system having a plurality of communication devices, the method comprising:
   establishing a set of cryptographic keys for secure communication, each cryptographic key associated with a different geographic region;
   determining a geographic region associated with a mobile communication device based on the geographic region of the mobile communication device;
   forwarding one of the cryptographic keys in the set of cryptographic keys to the mobile communication device, the forwarded one of the cryptographic keys being selected in response to the determined geographic region of the mobile communication device and the geographic region associated with the forwarded one of the cryptographic keys;
   detecting that the mobile device has moved to a new geographic region; and
   forwarding a different one of the cryptographic keys to the communication device, the different one of the cryptographic keys being selected responsive to the new geographic region and the associated geographic region of the different one of the cryptographic keys.

2. A method according to claim 1, wherein the at least one cryptographic key is used to derive further cryptographic keys associated with a set of sub-regions of the geographic region associated with the mobile communication device.

3. A communication system comprising:
   a plurality of mobile communication devices;
   a plurality of geographic regions and sub-regions;
   a hierarchical tree of cryptographic keys, each cryptographic key associated with a geographic region or sub-region; and
   wherein each mobile communication device changes which one of the cryptographic key is used for encrypting and decrypting transmissions as the mobile device changes geographic regions and wherein a selected cryptographic key is selected based on a geographic region of the mobile communication device and a geographic region associated with the selected cryptographic key.

4. A communication system according to claim 3, wherein at least one cryptographic key in the hierarchical tree is derived by applying a mathematical function to the cryptographic key of the next higher level in the hierarchical tree.

5. A computer program product for use on a computer system for managing encryption keys in a communication system having a plurality of mobile communication devices, the computer system comprising a processing device and a storage device having computer readable code of the computer program product stored thereon, the computer readable program code comprising:

program code operable when executed to establish a set of cryptographic keys for secure communication, each cryptographic key associated with a geographic region;

program code operable when executed to determine a geographic region associated with a mobile communication device;

program code operable when executed to select and distribute at least one cryptographic key to the mobile communication device based on the geographic region of the mobile communication device, the at least one cryptographic key being selected in response to the geographic region associated with the at least one cryptographic key and the determined geographic region associated with the mobile communication device;

program code operable when executed to detect that the mobile communication device has moved to a new geographic region; and program code operable when executed to distribute at least one cryptographic key to the mobile communication device based on the new geographic region of the mobile communication device and the geographic region associated with the at least one cryptographic key.

6. A computer program product according to claim 5, wherein the at least one cryptographic key is used to derive further cryptographic keys associated with a set of sub-regions of the geographic region associated with the mobile communication device.

\* \* \* \* \*